Patented Sept. 7, 1948

2,448,755

UNITED STATES PATENT OFFICE 2,448,755

PROCESS OF PREPARING 1,4-DICYANO BUTENE-2 FROM CORRESPONDING HALOGEN COMPOUNDS

Carl N. Zellner, Elizabeth, N. J., assignor to Tide Water Associated Oil Company, Bayonne, N. J., a corporation of Delaware No Drawing. Application March 28, 1941,
Serial No. 385,692

4 Claims. (Cl. 260—465.8)

This invention relates to new and useful organic compounds and to methods of preparing the same. More particularly, the invention relates to certain unsaturated di-cyano compounds in which the cyano radicals are attached to the terminal carbon atoms of a hydrocarbon chain, and to effective methods for synthesizing such compounds from relatively low-cost raw materials.

As an example of the new compounds included in the invention may be named 1,4 di-cyano butene-2. This compound, having the formula

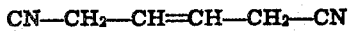

CN—CH₂—CH=CH—CH₂—CN and its derivatives and homologues are desirable chemical intermediates in the preparation of such useful products as resins, plastics and the like due to the presence of the active CN radicals and their position in relation to the general structure of the hydrocarbon chain. For example, by suitable hydrogenation the stated di-cyano compounds may be converted into the corresponding diamines or by suitable hydrolysis to dibasic acids. Such derivatives are useful in the preparation of linear polymers and other commercially valuable materials. Likewise, the double bond permits ready formation of addition products and consequent modification of the characteristics and properties of the di-cyano compounds or products produced therefrom.

The particular method of this invention for the preparation of the stated compounds varies somewhat in procedural aspects according to the raw materials used. Such methods generally will comprise a series of steps in combination. However, the essential reaction, which may be considered the gist of the methods of the invention, resides in the conversion of suitable terminal di-substituted alkenes into corresponding di-cyano alkenes by replacing the terminal substituents with cyano groups. I have discovered that the di-cyano alkenes can be readily synthesized by reacting suitable terminal di-substituted alkenes with certain cyanides. For example, one important embodiment involves reacting 1,4 di-halo butene-2 with cuprous cyanide to produce the 1,4 di-cyano butene-2 set forth above. As is well known, 1,4 halo substituted butene-2 can be prepared by suitably halogenating the four carbon atom compound butadiene, which has conjugated double bond arrangement. This treatment of conjugated compounds results in terminal dihalo substituted compounds of double bond structure which are necessary for treatment with cyanides to produce the di-cyano compounds of this invention. The reactions are as follows:

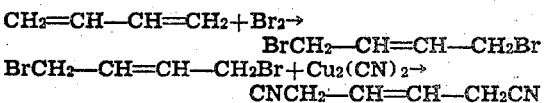

CH₂=CH—CH=CH₂+Br₂→
                BrCH₂—CH=CH—CH₂Br
BrCH₂—CH=CH—CH₂Br+Cu₂(CN)₂→
                CNCH₂—CH=CH—CH₂CN

As can be seen, the position of the double bond taken during bromination is retained in the final di-cyano compounds and the latter are substituted in the terminal positions, making the di-cyano compounds particularly desirable chemical intermediates.

Thus one important feature or concept of the invention consists in employing as starting materials in the step illustrated by the first reaction shown above olefins of conjugated double bond structure suitable for conversion to terminal di-substituted alkenes necessary for subsequent conversion to the stated corresponding terminal substituted di-cyano alkenes.

I have further discovered that certain desirable original starting materials can be employed in producing such conjugated compounds and the series of steps for converting such original starting materials into the di-cyano compounds of the invention are considered important embodiments. Various embodiments of the invention are illustrated in the following examples:

Example I 71 parts by weight of 1,4 dibrom butene-2, obtained by cracking cyclohexene by means of a hot wire to produce butadiene and subsequently brominating the butadiene in trichlormethane solution at a temperature below 0° C., were mixed with 62.8 parts by weight of cuprous cyanide. This represents a 5% excess of cuprous cyanide. The resulting mixture was heated gradually to start the reaction. During the first part of the reaction artificial cooling was necessary, the reaction being strongly exothermic. The reaction was completed by heating at 95° C. for about 30 minutes. The reaction mixture was then subjected to vacuum distillation and the fraction boiling between 135° C. and 140° C. at 4 mm. of Hg pressure consisting of 1,4 di-cyano butene-2 was collected.

The 1,4 di-cyano butene-2 is slightly soluble in xylene and benzene, difficultly soluble in ether and immiscible with water. On recrystallization from xylene, white crystals having a melting point of 79° C. are obtained. Upon heating with potassium hydroxide in a nitrogen stream 19.06 milliequivalents per gram of $NH_3$ were liberated. This compares with the theoretical which is 18.87 milliequivalents per gram. Upon refluxing with alcoholic potassium hydroxide slow hydrolysis occurred. The saponification value of the hydrolyzed material was 17.3 milliequivalents per gram.

Example II

Cyclohexane was thermally cracked by passage over a red hot nichrome wire and the resulting material subjected to distillation. The fraction containing hydrocarbons of four carbon atoms which boils from about −5° to about +2° C. was collected. This fraction, consisting chiefly of butadiene with some butylenes, was dissolved in chloroform and treated with the molar quantity of bromine at a temperature below 0° C. The resulting product was distilled. Two fractions, one consisting of 58 parts boiling at 55°–80° C. at 20 mm. of Hg pressure and the other 96 parts boiling at 85°–95° C. at 20 mm. of Hg pressure were collected. The last mentioned fraction contains mainly 1,4 dibrom butene-2. The 55°–80° C. fraction which contains 1,2 dibrom butene-2 and possibly other isomers was heated for 3 hours at 175° C. and then redistilled. This resulted in isomerization of the stated isomers to form 12 more parts of 1,4 dibrom butene-2 which were collected as distillate boiling at 85°–95° C. at 20 mm. Hg pressure.

The 12 parts of 1,4 dibrom butene-2 were added to the 96 parts originally obtained and 105 parts of this 1,4 dibrom butene-2 were treated with 100 parts of cuprous cyanide suspended in 300 parts of dried xylene, 30 parts of Fuller's earth being added to facilitate starting the reaction. The entire mass was refluxed for about one hour and then distilled. After evaporating off the solvent a fraction of dibrom butene boiling at 85°–95° C./20 mm. Hg pressure and a second fraction of 1,4 di-cyano butene-2 boiling at 135°–140° C./3 mm. Hg pressure were obtained.

Examples III and IV hereinbelow illustrate the practice of the invention employing readily available, relatively low cost original starting materials. As indicated hereinabove, synthesis of the particular di-cyano compounds according to the invention necessitates using olefins of conjugated double bond structure in order that terminal substitution can be effected. I have discovered that naphthenic constituents of certain petroleum fractions can be converted to suitable olefins having the stated desirable structure. The method of combining this conversion of petroleum starting materials in combination with subsequent operations to produce the stated di-cyano compounds is considered an important feature of the present invention.

Example III

A straight run gasoline fraction boiling between 75° C. and 87° C. from a naphthenic base crude was used in this instance. This fraction was selected because it boils in the cyclohexane range. This fraction was hydrogenated over nickel to convert aromatics present to naphthenes and then subjected to thermal cracking to convert the cyclohexane to butadiene. The resulting material was distilled and the C4 fraction was collected. This fraction, analyzing approximately 73% butadiene, was dissolved in chloroform and chlorinated at −40° C. The product was distilled, the 1,2 dichlorobutene-2 fraction boiling between 102°–122° C. and the 1,4 dichlorobutene-2 fraction boiling between 122°–150° C. being collected separately. Preferably the 1,2 dichlorobutene-2 fraction is isomerized with the aid of a suitable catalyst to produce more of the 1,4 isomer and the 1,4 derivatives are then combined. The resulting 1,4 dichlorobutene-2 is then converted to 1,4 di-cyano butene-2 in the manner described hereinabove.

Example IV

In this case there was used a fraction of a straight run gasoline from a naphthenic base crude boiling between 65° C. and 75° C. This fraction contained very little cyclohexane but was rich in methyl cyclopentane.

I have discovered that by a process of isomerization the methyl cyclopentane contained in the fraction can be converted to its isomer cyclohexane. The advantage of this procedure is that the cyclohexane so formed, which boils at a higher temperature than the remaining constituents with which it is associated, can be separated therefrom by distillation. Thus, as distinguished from the method of Example III employing the cyclohexane cut as starting material, the present procedure provides cyclohexane relatively free from other constituents of the fraction. This makes for less difficulties in the subsequent steps of converting the cyclohexane to butadiene and thence to 1,4 di-cyano butene-2.

In effecting the isomerization the stated 65°–75° C. gasoline fraction was refluxed over aluminum chloride for 30 hours and the resulting reaction mixture was fractionated. A distillate fraction boiling between 75° C. and 87° C. upon analysis showed 80% naphthenes and 10% aromatics. If desired the naphthenic content of the 75–87° C. fraction may be raised to about 90% by hydrogenation.

The resulting naphthenic material when cracked by means of a hot wire yielded a C4 fraction high in butadiene. The fraction was dissolved in chloroform, reacted with one mole of bromine and distilled as set forth in Example I. The 1,4 dibrombutene-2 fraction boiling at 77°–78° C. at 8 mm. Hg pressure was converted to the di-cyano derivative in the manner described in Example I.

Referring to the cyanide reaction resulting in formation of the di-cyano compounds of the invention, it should be understood that this reaction is not limited to the use of cuprous cyanide employed in the illustrative examples set forth above. Other suitable cyanides, and in general any cyanide or other reactant capable of substituting the terminal groups with CN radicals, may be employed. Likewise instead of separating the di-cyano compounds by distillation subsequent to the cyanide treatment the reaction mixture may be extracted with suitable selective solvents or otherwise treated to effect separation of the di-cyano compounds from the remaining constituents.

Also, the invention is not to be considered limited to di-cyano alkenes otherwise unsubstituted. For instance, instead of employing butadiene as the conjugated double bond reactant, substituted olefins of conjugated double bond arrangement such as alkyl substituted derivatives, for example isoprene, may be used. In such cases correspondingly substituted di-cyano alkenes will be formed as the final product.

I claim:

1. A method of producing a 1,4 dicyano butene-2 which comprises reacting a 1,4 dihalo butene-2 of the group consisting of 1,4 dichloro butene-2 and 1,4 dibromo butene-2 with a copper cyanide to replace each of the halogen atoms in said dihalo butene-2 with a cyano group, said reaction being conducted under substantially non-aqueous conditions in the presence of a substantially non-aqueous non-polar liquid, said liquid being a solvent for said 1,4 dihalo butene-2 and unreactive with 1,4 dicyano butene-2, copper cyanide and the aforesaid dihalo butene-2.

2. A method for obtaining 1,3 dicyano butene-2 from butadiene which comprises halogenating butadiene with a halogen of the group consisting of chlorine and bromine to obtain a halogenated mixture containing a 1,4 dihalo butene-2 and a 1,2 dihalo butene-2, distilling said halogenated mixture to obtain a low boiling fraction containing 1,2 dihalo butene-2 and a higher boiling fraction consisting essentially of 1,4 dihalo butene-2, subjecting said lower boiling fraction to an isomerization treatment to convert the 1,2 dihalo butene-2 to a 1,4 dihalo butene-2, combining the 1,4 dihalo butene-2 obtained from said isomerization treatment with the aforesaid higher boiling fraction, and reacting the resulting product under substantially non-aqueous conditions with a copper cyanide to replace the halogen atoms in the 1,4 dihalo butene-2 with cyano groups.

3. A method as defined in claim 2, wherein the copper cyanide is cuprous cyanide and the reaction is conducted in the presence of a substantially non-aqueous non-polar liquid, said liquid being a solvent for the 1,4 dihalo butene-2 and unreactive with the 1,4 dihalo butene-2, cuprous cyanide and 1,4 dicyano butene-2.

4. A method for producing 1, 4 dicyano butene-2 from a petroleum fraction relatively high in methyl cyclopentane which comprises treating said fraction to convert the methyl cyclopentane to cyclohexane, separating the cyclohexane from the remaining materials of the reaction mixture by distillation, cracking the cyclohexane to produce butadiene, halogenating the butadiene with a halogen of the group consisting of chlorine and bromine to form a mixture containing 1,4 dihalo butene-2 and 1,2 dihalo butene-2, distilling said halogenated mixture to obtain a low boiling fraction containing 1,2 dihalo butene-2 and a higher boiling fraction consisting essentially of the 1,4 dihalo butene-2, subjecting said lower boiling fraction to an isomerization treatment to convert the 1,2 dihalo butene-2 to 1,4 dihalo butene-2, combining the 1,4 dihalo butene-2 obtained from said isomerization treatment with the aforesaid higher boiling fraction, and reacting the resulting product under substantially non-aqueous conditions with a copper cyanide to replace the halogen atoms in the 1,4 dihalo butene-2, with cyano groups.

CARL N. ZELLNER.

REFERENCES CITED

The following references are of record in the file of this patent:

UNITED STATES PATENTS

| Number | Name | Date |
|---|---|---|
| 2,097,155 | Groll et al. | Oct. 26, 1937 |
| 2,102,611 | Carothers et al. | Dec. 21, 1937 |
| 2,222,302 | Schmidt et al. | Nov. 19, 1940 |
| 2,342,101 | Cass et al. | Feb. 22, 1944 |

OTHER REFERENCES

Errera et al., "Ber. Soc. Chem. Ges.," vol. 34, pages 3704, 3705–3710 (1901).

Dimroth, "Ber. Soc. Chem. Ges.," vol. 35, page 2882 (1902).

Schmitt, "Annales de Chemie et de Phys.," (8), vol. 12, page 421 (1907).

Simonsen et al., "J. Chem. Soc.," (London), vol. 107, page 798 (1915).

McMaster et al., "J. Am. Chem. Soc.," vol. 40, page 970.

Karrer, "Organic Chemistry," (1938), pages 54–55.